Jan. 16, 1940.   J. R. O'CONNELL   2,187,170
FEED CHUCK
Filed Oct. 3, 1938
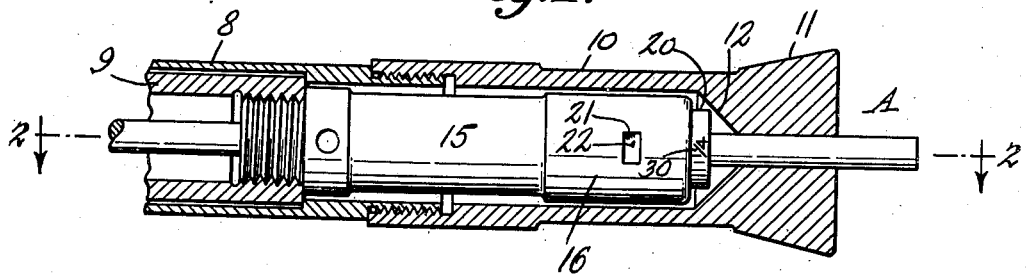
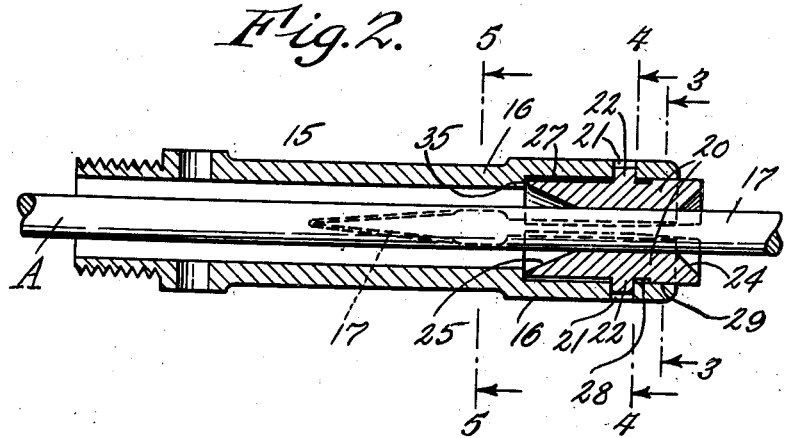
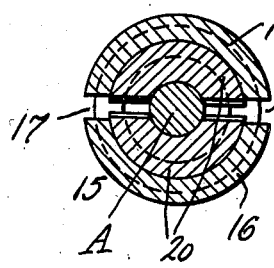
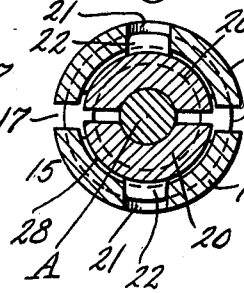
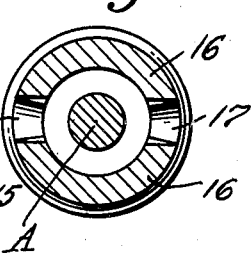
INVENTOR
James R. O'Connell
BY
Parker, Prochnow & Farmer
ATTORNEYS Patented Jan. 16, 1940

2,187,170

UNITED STATES PATENT OFFICE 2,187,170

FEED CHUCK

James R. O'Connell, Elmira, N. Y., assignor to Hardinge Brothers, Inc., Elmira, N. Y.

Application October 3, 1938, Serial No. 233,017

12 Claims. (Cl. 29—62)

This invention relates to improvements in feed chucks or feed fingers of the kind commonly used for advancing the work in automatic screw machines or the like.

One of the objects of this invention is to provide feed chucks of this kind with work engaging pads of improved construction. Another object is to provide a feed chuck with a work engaging pad of increased length and improved bearing upon the work. Another object is to provide a pad of this kind which is so formed as to extend beyond the outer end of the feed chuck for the purpose of providing space on the peripheral portion of the pad for indicia relating to the size or other characteristics of the pad.

A further object of this invention is to provide a feed chuck which is formed to cooperate with the pads in such a manner as to prevent damage or breaking of the pad by the work when fed into the machine. It is also an object to provide a feed chuck having a seat or recess of larger diameter than the bore of the feed chuck and to place the pads in such seats to avoid damage to the inner edges of the pads, by the work fed to the machine.

Other objects of the invention will be apparent from the following description and claims.

In the accompanying drawing:

Fig. 1 is a fragmentary longitudinal view, partly in section, of a part of a work receiving sleeve of an automatic screw machine, the sleeve having a feed chuck embodying this invention applied thereto.

Fig. 2 is a longitudinal central sectional view of the feed chuck.

Figs. 3, 4 and 5 are transverse sectional elevations respectively on lines 3—3, 4—4, and 5—5, Fig. 2.

In Fig. 1, 8 and 9 represent two tubular members of a rotary work holding and advancing assembly of an automatic screw machine. One of these members is arranged telescopically within the other and both of these members are rotated about a common axis in any suitable manner, not shown. The rotary member or tube 8 has a collet or work gripping member 10 suitably secured thereto. This collet operates in the usual manner to grip the work A, which is generally in the form of a rod, while the portion of the rod extending beyond the collet is operated upon by the cutters or other metal working devices of the machine. This collet comprises two or more spring fingers which are so arranged that the spring action normally swings the outer ends of the fingers outwardly out of engagement with the work. The ends of the spring fingers of the collet are also provided with inclined or substantially frusto-conical surfaces 11, which are engaged by corresponding faces of another part of the screw machine (not shown), by means of which the ends of the spring fingers of the collet are pressed into engagement with the work A. The spring fingers of the collet are usually provided at their outer or free ends with enlarged tool gripping portions, these enlarged portions terminating at their inner ends in a substantially frusto-conical or tapering face 12, which converges toward the work engaging inner face of the collet. Collets of this type are commonly employed in connection with automatic screw machines, and of themselves do not constitute part of this invention.

15 represents a feed chuck or feed finger which is secured to the sleeve 9, and which may extend into the collet 10. This feed chuck also has at its outer end a plurality of spring fingers 16 formed by providing suitable slits 17 in the feed chuck, which extend inwardly from the outer end of the feed chuck. The feed chuck shown is of the cantilever spring type, which engages the work continuously by spring tension during the passage of the work through the screw machine. After a finished part has been cut from the end of the rod A, the jaws or fingers of the collet are opened and during this period, the feed finger advances toward and into the collet to a position approximately as shown in Fig. 1, carrying the work A with it. The jaws of the collet are then closed as shown in Fig. 1, whereupon the feed chuck 15 is moved to the left into a position in which it is ready to again advance the work when released by the collet.

The feed chuck shown in the accompanying drawing is provided at its outer end with removable work engaging members or pads 20, one of these pads being preferably provided for each spring finger of the feed chuck and the pads are removably held on the ends of the feed fingers in any suitable or desired manner. In the particular construction shown, each finger of the feed chuck is provided with a hole or recess 21 and each work gripping pad 20 is provided with a projection 22 formed to fit into the hole or recess 21 in such a manner as to hold the pad against movement lengthwise or circumferentially of the axis of the feed chuck. If, however, the fingers of the feed chuck are separated, for example, by forcing them apart by means of an implement inserted into the slot 17, the pads can be readily removed by moving the projections 22 out of the apertures or recesses 21. By means of this arrangement, the pads can be replaced when worn out and it is also possible to replace the pads by other pads having a different bore or internal diameter or shape, when work of a different size or shape is to be operated upon. Each set of pads is preferably provided with a substantially frusto-conical or tapering recess 24 in the outer end thereof and with another similar recess 25 at the inner end thereof, so that work can be positioned between the work engaging faces of the pads by forcing the work from either direction into the tapering recesses, thus spreading the pads apart against the action of the spring fingers, to permit the work to enter between the work engaging faces of the pads.

In feed chucks with pads, as heretofore employed, it has been the custom to have these pads terminate approximately flush with the outer end of the feed chuck or within the end thereof. I have found that it is decidedly advantageous to provide pads which are so arranged on the feed chuck that the ends of the pads extend to a substantial extent beyond the spring fingers of the feed chuck, as clearly shown in Figs. 1 and 2. This arrangement of the pads or work gripping members relatively to the feed chuck has a number of advantages. In the first place, it is desirable to form the portion of the pads extending inwardly from the projection 22 thereof, or, in other words, to the left of the projections 22 in Fig. 2, of slightly smaller diameter than the portions of the pads which are gripped by the outer ends of the feed chuck. I have shown in the drawing a clearance 27 between the inner ends of the pads and the feed fingers of the chuck 15, this clearance being greatly exaggerated on the drawing for purposes of clearness. In actual construction, this clearance is comparatively small, generally somewhere in the neighborhood of .010 of an inch. A similar groove 28 may also be formed on the outer periphery of the pads at the opposite side from the projections 22 thereof, so that the pads are engaged by the feed fingers only at the outer ends thereof, along the substantially cylindrical surface or zone 29 of the pads. This construction has the advantage of having the fingers of the feed chuck exert their spring pressure near the outer ends thereof. It will be noted that by extending the pads outwardly beyond the end of the feed chuck, the bearing surface or zone 29 on the pads may be provided at the extreme outer ends of the feed fingers, in such a manner that the outer recessed ends 24 of the pads are located beyond the feed chuck. This arrangement provides for a very efficient use of the extremely limited space available in the work feeding and holding sleeves of screw machines. It will be noted that the portion of each pad which extends outwardly beyond the end of the feed chuck will enter into the conical recess 12 of the collet, so that by means of the extension of the pad, no additional space is required and no adjustment of the parts of the screw machine are necessary.

It will also be noted by reference to Fig. 2 that by means of this extension, the pads can be made longer, and the construction also balances the pressure with which the pad bears against the work over the entire length of the surface of the pad contacting with the work. In other words, the action of the spring fingers on the pad is somewhat similar to that of a swingle tree, namely in that a slight swinging action of the pads may take place along the contacting zone 29 between the pads and the spring fingers. Consequently, if a bar is fed from the left into the frusto-conical portion 25 of the pads, a slight swinging apart of the inner ends of the pads may take place to facilitate the insertion of the bar but when the bar is in place, the pressure will be exerted along the entire inner work engaging face of the pads. Also if the bar or work A is very long or heavy and the quick feeding movement of the chuck tends to cause slippage between the bar and the pads, there will be a slight tendency of the pads to swing about the contact zone 29, thus causing the leading ends of the work engaging surfaces of the pads to swing into still firmer contact or engagement with the work. Furthermore, by extending the pads outwardly beyond the feed chuck, the bearing surface of the pad against the work can be proportionately increased, which increases the life of the feed chuck.

It is also possible as a result of the extension of the pads beyond the ends of the feed fingers, to apply to the outwardly extending peripheral portions of the pads indicia 30, such for example as dimensions or indications as to the nature of the work for which the pads are designed. This is very desirable, since such indicia cannot be placed on any other portions of the pads, and it is also very difficult without such indicia to determine the size of the work for which the pads are intended, since when the pads are pressed into engagement with each other by the spring fingers, the diameter of the bore through the pads cannot be measured, since it is different than when the pads are separated by engagement with the work. Furthermore, since the feed chucks may be used with a variety of different pads, such indicia would serve no useful purpose, if applied to the feed chucks themselves.

Another feature of my invention is that I provide the chuck with means for protecting the pads against damage by the work when the work is forced into the feed chuck. This can be very conveniently done by means of the construction illustrated, in which the bore of the feed chuck is of susbtantially uniform diameter from the inner end thereof to the portion occupied by the feed chuck, at which the inner diameter is increased, thus forming a seat of increased diameter for the pads. The difference in diameters of these two parts results in the formation of a shoulder 35. As a result of this construction, the inner ends or edges of the pads are protected against contact with the work when fed into the machine, since these edges are of greater diameter than the outer edges of the shoulder 35. This arrangement, therefore, prevents damage and possible breakage of the pads by the work when the same is forcibly moved into engagement with the pads. Considerable force must be used in order to place the work between the pads, since these pads are pressed into contact with each other by the strong force of the spring fingers. Consequently, when the operator rams a rod into a machine provided with my improved chuck and pads, there is no chance that this rod will engage an edge portion of a pad and thus damage or break the same. Instead the portion of smaller diameter of the feed chuck guides the bar into engagement with the internally bevelled or inclined face 25 of the pad, which in turn guides the bar into a correct central position with reference to the pads and enables the bar to spread the pads apart sufficiently to permit entry of the bar between the pads. This construction is particularly desirable when the pads are made of relatively soft metals, so that they will not scratch the work.

I claim as my invention:

1. The combination with a feed chuck having spring fingers terminating at one end thereof, work engaging pads arranged at the end portions of said spring fingers, said spring fingers and pads engaging along a peripheral zone of the pads adjacent to the outer ends of the spring fingers, the portions of said pads spaced inwardly from said zone being arranged out of contact with said spring fingers, said pads having work engaging inner faces extending from the plane of the outer portion of said zone to a distance inwardly beyond the plane of the inner edge of said zone.

2. The combination with a feed chuck having spring fingers terminating at one end thereof, work engaging pads arranged at the end portions of said spring fingers, said spring fingers and pads engaging along a peripheral zone of the pads adjacent to the outer ends of the spring fingers, the portions of said pads spaced inwardly from said zone being arranged out of contact with said spring fingers, said pads having work engaging inner faces extending from the plane of the outer portion of said zone to a distance inwardly beyond the plane of the inner edge of said zone, and projections arranged inwardly of said zone and extending radially beyond the periphery of said zone, said spring fingers having recesses adapted to receive said projections.

3. A work feed mechanism for an automatic screw machine and the like including a work holding collet having a tubular portion provided with spring fingers having work engaging jaws at their outer ends, the inner ends of said jaws being provided with flaring portions terminating at a tubular portion of said collet, a feed chuck arranged to extend into said tubular portion of said collet and having spring fingers exerting pressure toward the axis of said feed mechanism, and work engaging pads arranged at the end portions of said spring fingers and extending from said spring fingers into engagement with the work, said pads extending outwardly beyond the outer ends of said spring fingers into a position to enter said flaring portions of said jaws of said collet when said feed chuck is in its outer work advancing position.

4. A feed chuck having spring fingers extending toward the outer end of said chuck, said feed chuck having a substantially cylindrical internal surface near the outer end thereof, work engaging pads arranged in said cylindrical outer portion of said feed chuck and having at the inner end thereof flaring work guide faces terminating at the inner edges of said pads, said feed chuck having an internal shoulder at the inner edge of said cylindrical pad engaging surface thereof, said shoulder extending toward the axis of said chuck to a greater extent than the inner edges of said pads, whereby the inner edges of said pads are protected by said shoulders against contact with work being fed to said pads.

5. A feed chuck having spring fingers extending outwardly to one end thereof and having a substantially cylindrical bore terminating near said end in a bore of larger diameter, work engaging pads removably connected with said spring fingers and seated in said bore of larger diameter, said pads having work engaging surfaces terminating at their inner ends in flaring work guide faces, whereby the bore of smaller diameter guides work fed to said pads into engagement with said flaring faces of said pads, and an outwardly extending projection on each of said pads located intermediate of the ends thereof, each of said fingers having a recess spaced from said outer end and into which said projection may enter to secure said pads against movement lengthwise and laterally of said fingers.

6. The combination with a feed chuck having spring fingers extending toward one end thereof and having a substantially cylindrical inner surface extending inwardly from said end, of work engaging pads arranged at the outer ends of said spring fingers and urged by said fingers into engagement with the work and having an outer cylindrical surface adapted to bear against said inner surface of said fingers and having portions thereof extending beyond said ends of said fingers, and means for securing said pads against movement lengthwise of said fingers.

7. The combination with a feed chuck having spring fingers extending toward one end thereof and having a substantially cylindrical inner surface extending inwardly from said end, of work engaging pads arranged at the outer ends of said spring fingers and having an outer cylindrical surface adapted to bear against said inner surface of said fingers and having portions of said cylindrical outer surface extending beyond the ends of said fingers, and an outwardly extending projection on each of said pads, each of said fingers having a recess spaced from said outer end into which said projection may enter to secure said pads against movement lengthwise and laterally of said fingers.

8. The combination of a feed chuck having spring fingers extending toward one end thereof, of work engaging pads arranged at the outer ends of said spring fingers and having inner work engaging surfaces and urged by said fingers into engagement with the work, said pads having portions thereof extending beyond said ends of said fingers, said work engaging faces of said fingers terminating in outwardly flaring faces extending to the outer ends of said spring fingers, said outwardly flaring faces being arranged mainly within the portions of said pads which extend beyond said spring fingers.

9. The combination with a feed chuck having spring fingers terminating at one end thereof, work engaging pads arranged at the end portions of said spring fingers, said spring fingers and pads engaging along a peripheral zone of the pads adjacent to the outer ends of the spring fingers and having portions thereof extending beyond said ends of said spring fingers, the portions of said pads spaced inwardly from said zone being arranged out of contact with said spring fingers, said pads having work engaging inner faces extending from the plane of the outer portion of said zone to a distance inwardly beyond the plane of the inner edge of said zone.

10. A feed chuck having spring fingers extending outwardly to one end thereof and having a substantially cylindrical bore terminating near said end in a bore of larger diameter, work engaging pads removably connected with said spring fingers and seated in said bore of larger diameter, said pads having work engaging surfaces terminating at their inner ends in flaring work guide faces, whereby the bore of smaller diameter guides work fed to said pads into engagement with said flaring faces of said pads, and a radially outwardly extending projection on each of said pads located intermediate of the ends thereof, each of said fingers having a recess spaced from said outer end and into which said projection may enter to secure said pads against movement lengthwise and laterally of said fingers, said pads and fingers having annular cooperating surfaces arranged axially outwardly from said projections of said pads and having the portions of said pads extending axially inwardly from said projections spaced from said fingers to permit a slight swinging of each pad relatively to its feed finger.

11. A feed chuck having spring fingers extending outwardly to one end thereof and having a substantially cylindrical bore terminating near said end in a bore of larger diameter, work engaging pads removably connected with said spring fingers and seated in said bore of larger diameter, said pads having work engaging surfaces terminating at their inner ends in flaring work guide faces, whereby the bore of smaller diameter guides work fed to said pads into engagement with said flaring faces of said pads, and a radially outwardly extending projection on each of said pads located intermediate of the ends thereof, each of said fingers having a recess spaced from said outer end and into which said projection may enter to secure said pads against movement lengthwise and laterally of said fingers, said pads having end portions extending beyond said ends of said spring fingers.

12. A feed chuck having spring fingers extending outwardly to one end thereof and having a substantially cylindrical bore terminating near said end in a bore of larger diameter, work engaging pads removably connected with said spring fingers and seated in said bore of larger diameter, said pads having work engaging surfaces terminating at their inner ends in flaring work guide faces, whereby the bore of smaller diameter guides work fed to said pads into engagement with said flaring faces of said pads, and a radially outwardly extending projection on each of said pads located intermediate of the ends thereof, each of said fingers having a recess spaced from said outer end and into which said projection may enter to secure said pads against movement lengthwise and laterally of said fingers, said pads and fingers having annular cooperating surfaces arranged axially outwardly from said projections of said pads and having the portions of said pads extending axially inwardly from said projections spaced from said fingers to permit a slight swinging of each pad relatively to its feed finger, said pads having end portions extending beyond said ends of said spring fingers.

JAMES R. O'CONNELL.